UNITED STATES PATENT OFFICE.

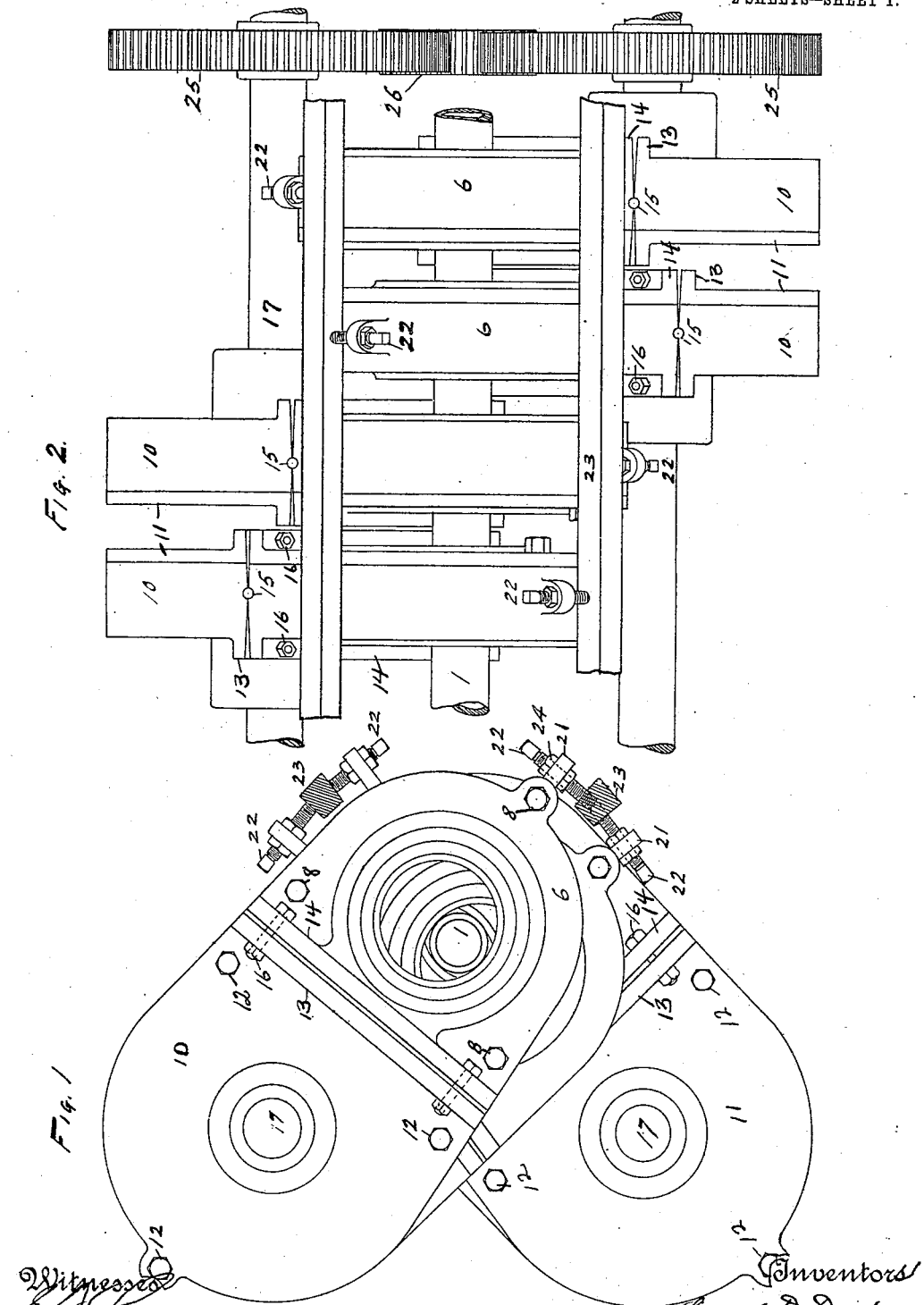

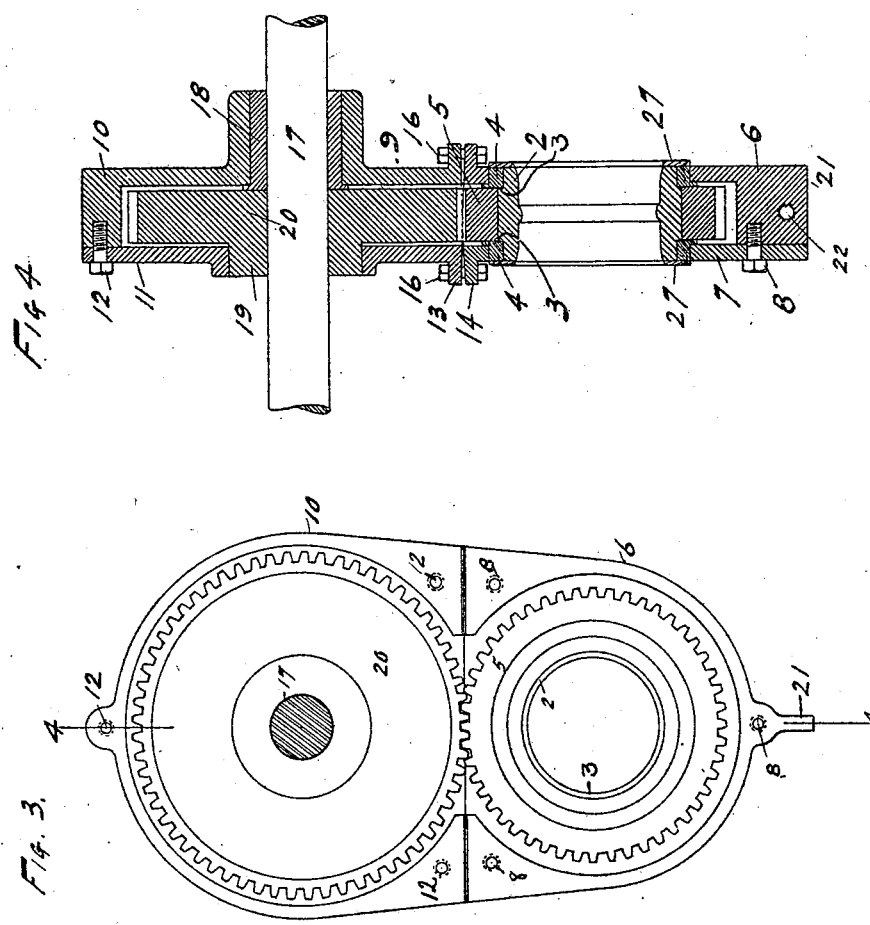

LEONARD D. DAVIS AND EMORY A. BEDIENT, OF ERIE, PENNSYLVANIA; SAID BEDIENT ASSIGNOR TO SAID DAVIS.

ROLLING-MILL.

951,179.  Specification of Letters Patent.  Patented Mar. 8, 1910.

Application filed November 30, 1908. Serial No. 465,348.

*To all whom it may concern:*

Be it known that we, LEONARD D. DAVIS and EMORY A. BEDIENT, citizens of the United States, residing at Erie, in the county of Erie and State of Pennsylvania, have invented new and useful Improvements in Rolling-Mills, of which the following is a specification.

This invention relates to rolling mills and consists in certain improvements in the construction thereof as will be hereinafter fully described and pointed out in the claims.

More particularly the invention relates to mills for rolling metallic ingots and forming them into tubes.

The invention is illustrated in the accompanying drawing as follows:

Figure 1 shows an end elevation of the mill. Fig. 2 a side elevation. Fig. 3 a side elevation of one of the rolling rings and driving mechanism, a part being removed to better show construction. Fig. 4 a section on line 4—4 in Fig. 3.

The mill is provided with rolling rings and the ingot or metallic tube being operated upon is passed through the rings. The rings being somewhat larger in diameter than the article being formed are rolled on the article, the article preferably rolling with the rings.

1 marks the tube or ingot; 2 the rolling rings or dies. These rings are provided with the shoulders 3 against which the bearing rings 4 are placed. A gear 5 is secured to the rolling ring 2. The rolling ring is mounted in the bearing formed by the bearing plate 6 and cover plate 7. The cover plate permits the assembling of the gears and rings and forms with the bearing plate 6 a bearing for the gear and ring, the bearing rings 4 providing the wearing surface. The cover plate is secured to the bearing plate by means of the screws 8.

A bearing support 9 is formed by the housing 10 and cover plate 11. The cover plate is secured to the housing 10 by means of the screws 12. The support is provided with the ears 13 along the edges opposing a face on the bearing. The bearing plate 6 and cover 7 are provided with similar ears 14. Pivot pins 15 are arranged between the faces and bolts 16 are passed through the ears 13 and 14. The opposing faces are cut away so that the bearing may be swung on the support 9 and locked in adjustment by means of the bolts 16, the bolts 16 on one side being loosened, and the bolts on the opposite side tightened to effect this result. The support 9 is journaled on the shaft 17 and bearing collar 18 is interposed between the housing 10 and the shaft 17 to form a bearing surface, and the hub 19 of the gear 20 extends through the cover plate 11 for a similar purpose. The gear 20 is fixed on the shaft 17 and drives the gear 5. The parting between the bearing and the support is preferably along the pitch line of the gears and the gears are so constructed as to permit a slight shifting of the bearing without seriously interfering with the action of the gears.

We prefer to mount two of the rings or dies 2 on the same driving shaft, one ring being arranged to operate on one side of the ingot or tube and the other ring on the opposite side, both of said rings being driven from a common shaft on which they are mounted.

We prefer to provide means for adjusting the rings so as to vary the diameter of the pass. To accomplish this, we provide the bearings with the lugs 21. Screws 22 extend through these lugs into the posts 23 on the frame (not shown) and nuts 24 are arranged on each side of the lugs 21 and are set against the lugs 21. It will readily be seen that by operating the nuts 24 the rings or dies may be adjusted and locked in any desired position. We also prefer to have a plurality of the shafts 17 with a plurality of rings driven from these shafts, each operating upon the same pass. As shown, there are four rings and these are arranged to operate at four equidistant points on the ingot. To accomplish this, they are arranged so that lines from the shafts 17 to the axis of the ingot are substantially at right angles. The gears 25 are arranged on the shafts 17 and a common gear 26 drives the gears 25. By following the movement it will be noted that the gear 26 drives all the rings in the same direction.

It is very desirable to protect the bearings from the scale incident to the use of the machine. We, therefore, secure the plates 27 to the rolling rings 2. These extend over and in close contact with the rings 4 and plates 6 and 7 so that the joint formed by the bearing is completely closed.

What we claim as new is:

1. In a rolling mill the combination of a rolling ring; a bearing for said ring; a gear on said ring; a bearing support; a shaft on which said support is mounted; a gear on said shaft for driving the gear on the ring; and means for angularly adjusting the bearing relatively to the shaft to vary the axis of the ring relatively to the shaft.

2. In a rolling mill the combination of a rolling ring; a bearing for said ring; a gear on said ring; a bearing support; a shaft on which said support is mounted; a gear on said shaft for driving the gear on the ring; and means for angularly adjusting the bearing relatively to the support to vary the axis of the ring relatively to the shaft.

3. In a rolling mill the combination of a rolling ring; a bearing for said ring; a gear on said ring; a bearing support; a shaft on which said support is mounted; a gear on said shaft for driving the gear on the ring, said bearing and support having their opposing faces adapted to permit the swinging of the bearing on the support; and means for locking the bearing in the various positions to which it may be adjusted.

4. In a rolling mill the combination of a rolling ring; a bearing for said ring; a gear on said ring; a bearing support; a shaft on which said support is mounted; a gear on said shaft for driving the gear on the ring, said bearing and support having their opposing faces adapted to permit the swinging of the bearing on the support; and means for locking the bearing in the various positions to which it may be adjusted comprising the bolts passed through each side of the opposing faces.

5. In a rolling mill the combination of a rolling ring; a bearing for said ring; a gear on said ring; a bearing support; a shaft on which said support is mounted; a gear on said shaft for driving the gear on the ring, said bearing and support having their opposing faces adapted to permit the swinging of the bearing on the support; a pivot pin between the opposing faces; and means for locking the bearing in different positions relatively to said support.

6. In a rolling mill the combination of two rolling rings arranged to operate upon opposite sides of a work piece as it passes through them; bearings for said rings; gears on said rings; supports for said bearings comprising a common shaft; gears on said shaft for driving the gears on the rings; and means for adjusting said rings about the common shaft as a center toward and from the axis of the pass through the rings.

7. In a rolling mill the combination of two rolling rings arranged to operate upon opposite sides of a work piece as it passes through them; bearings for said rings; gears on said rings; supports for said bearings comprising a common shaft; gears on said shaft for driving the gears on the rings; and means for adjusting said rings toward and from the axis of the pass through them, and angularly with relation to the axis of the pass.

8. In a rolling mill, the combination of a rolling ring, bearing rings, a gear arranged on the rolling ring, a bearing plate and a cover plate forming a bearing, said bearing plate and cover plate being provided with ears, a housing and plate forming a support, said housing and plate having ears, bolts passing through said ears, a driving gear arranged in the housing for driving the gear on the rolling ring, and a shaft on which the driving gear and support are mounted.

9. In a rolling mill the combination of a rolling ring; a bearing for said ring; and closures for the bearings comprising plates secured to the ring at each side and extending over the joint between the ring and its bearing.

10. In a rolling mill the combination of a rolling ring; a bearing for said ring having a pivotal face; and support for said bearing also having a pivotal face; and means for adjusting the bearing on said support by swinging the same on said pivotal face; and means for driving the ring.

In testimony whereof we have hereunto set our hands in the presence of two subscribing witnesses.

LEONARD D. DAVIS.
EMORY A. BEDIENT.

Witnesses:
MAY BEDIENT,
RITCHIE T. MARSH.